(No Model.) M. G. FARMER. 2 Sheets—Sheet 2.
ELECTRICAL MEASURING APPARATUS.
No. 309,937. Patented Dec. 30, 1884.

UNITED STATES PATENT OFFICE.

MOSES G. FARMER, OF NEWPORT, RHODE ISLAND.

ELECTRICAL MEASURING APPARATUS.

SPECIFICATION forming part of Letters Patent No. 309,937, dated December 30, 1884.

Application filed April 29, 1884. (No model.)

*To all whom it may concern:*

Be it known that I, MOSES G. FARMER, a citizen of the United States, and a resident of Newport, in the county of Newport and State of Rhode Island, have invented certain new and useful Improvements in Electrical Measuring Apparatus, of which the following is a specification, reference being had to the drawings accompanying and forming a part of the same.

My present invention consists in an apparatus for conveniently and readily ascertaining the internal resistance of a galvanic battery. This apparatus is designed to be used in accordance with a method of measuring and determining the resistance of a battery, the principles of which are as follows:

It is well known that if a galvanometer, a rheostat, and a galvanic battery be included in a simple circuit, a given deflection of the galvanometer-needle is produced, which increases as coils or sections of the rheostat are cut out. It is also well known that if a shunt or branch circuit containing a resistance be formed across the poles the deflection of the galvanometer is reduced in proportion to the amount of the shunt-resistance. Inasmuch as these effects upon the position of the galvanometer-needle are opposite in kind, it is very evident that the line-resistance may be wholly withdrawn and a shunt simultaneously closed without affecting the position of the needle if the proper relations of line and shunt resistance exist.

From the conditions here obtaining it can be readily shown that $B = \frac{R}{G} \times S$, in which B is the internal resistance of the battery; R, the resistance in circuit with the galvanometer, which, for convenience, is herein designated as the line-resistance; G, the resistance of the galvanometer, and S that of the shunt. If we make R equal to G, we have B equal to S, or, in other words, when the line-resistance or rheostat equals that of the galvanometer and the shunt-resistance equals the internal resistance of the battery, the line-resistance may be cut out and the shunt at the same instant closed without moving the galvanometer-needle. For practically applying this principle to use it is essential to the determination of accurate results that the two operations of cutting out R and bringing in S should be simultaneous, or practically so. I have devised an apparatus by which this may be readily done, and by means of which the other necessary steps in the process may be easily performed.

For a description of the apparatus, I will now refer to the accompanying drawings.

Figure 1:
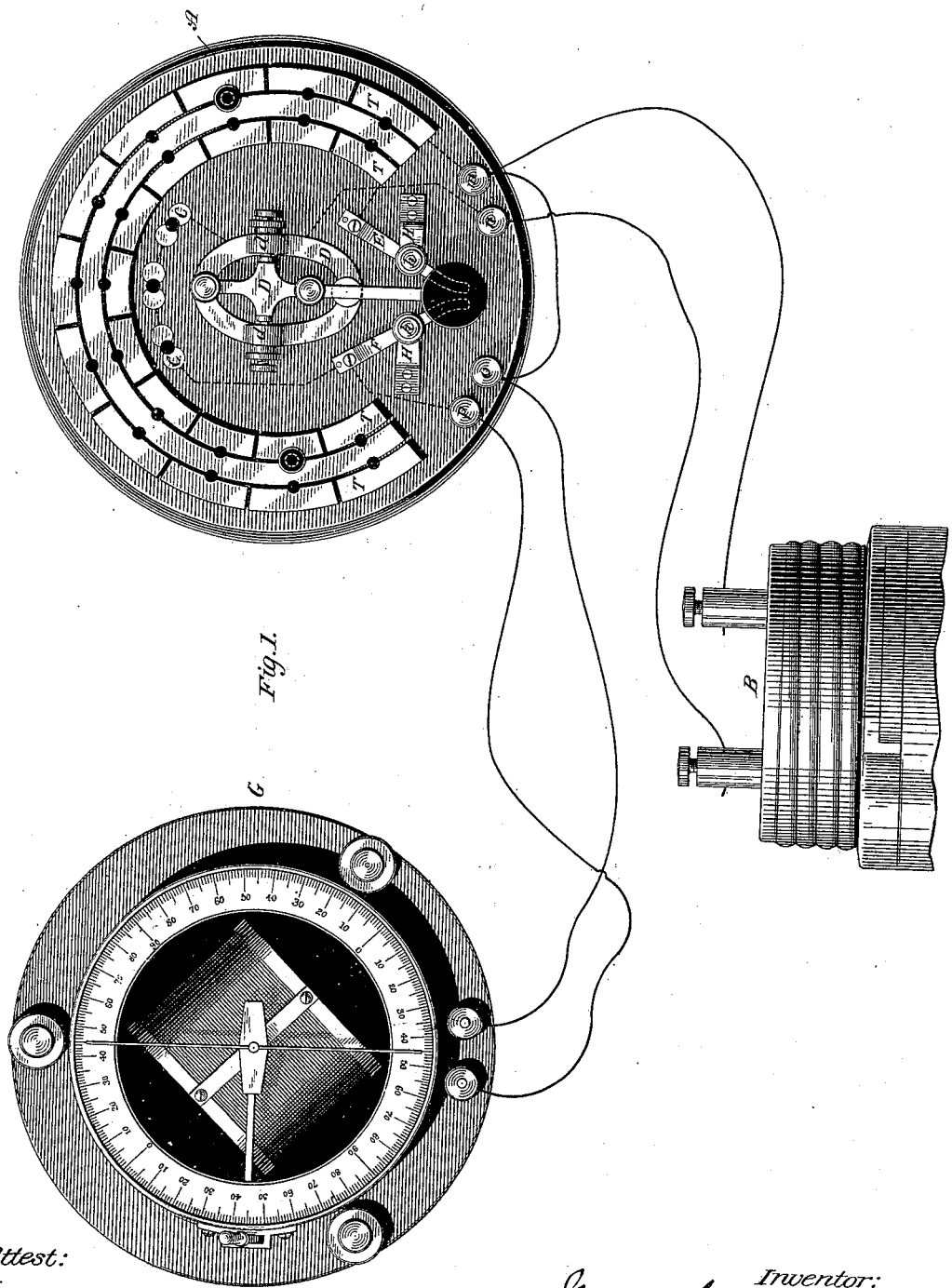
Figure 2:
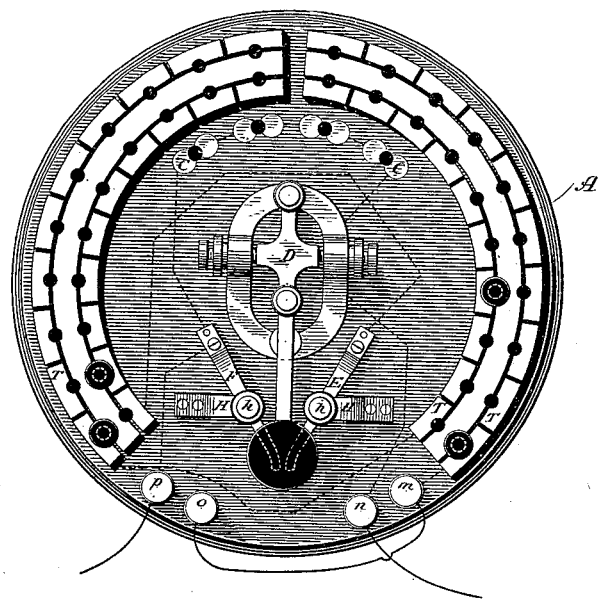

Figure 1 is a diagram showing the different parts connected in their proper operative relations. Fig. 2 is a plan view of a modified form of the instrument, and Fig. 3 a diagram of the circuits, illustrating the method of using the instrument I use a box or case, A, (shown in plan in Figs. 1 and 2,) containing a given number of resistance-coils connected with the plates T of an ordinary plug or pin rheostat. The number of coils and plates varies according to the requirements of particular cases, and the connections made to obtain any number of ohms and fractions of an ohm that may be necessary. I prefer a circular disposition of the plates similar to that shown. On the box A I also place the plates C, of a resistance of more limited capacity, the coils of which are contained in the box that incloses the others.

In the space inclosed by the plates T is mounted a key, D, pivoted at $d$, and provided with front and back stops, $a$ $b$. (Shown in Fig. 3.) On each side of the key is secured a spring contact-strip, E F, over which are stops H, with adjusting-screws $h$ passing through them. The ends of strips E F are brought under the forward end of the key-lever, where is a contact-plate, $e$, that depresses both springs simultaneously when the key is depressed. The plate A has four binding-posts, $m$ $n$ $o$ $p$. Post $m$ connects with the outer row of the plates T; post $n$ with the metal base of the key D. Connection is also made by a wire from the base of key D to the first of the series of plates C. By other wires connection is established between the last of the series of plates C to the strip F, and from this to post $p$. The strip E is connected with the end plate of the inner row of plates T.

Fig. 2 is a form of the apparatus similar in all respects to that described, but provided with a greater number of rheostat-plates, which are arranged in two sets, but connected in the usual manner.

In using the instrument, the poles of a battery, B, are connected, respectively, to the posts *m n*, and a galvanometer, G, connected to the posts *o p*. Post *o* is then connected to post *m*. The problem being to measure the internal resistance of the battery B, the resistance of the galvanometer G and that of the resistance R are first made equal, and then the pins between plates T are shifted until a depression of the key D is followed by no movement of the galvanometer-needle. The resistance indicated by the positions of the pins in plates T will therefore be the resistance of the battery.

Figure 3:
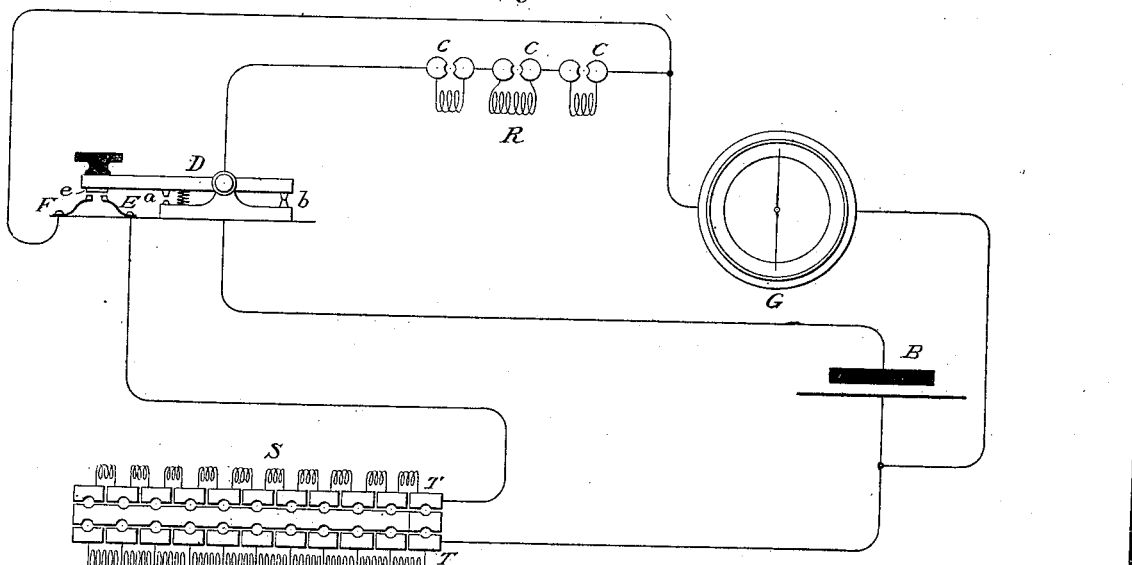

It will be observed by reference to Fig. 3 that normally the battery-circuit is through the resistance R and the galvanometer G. By depressing the key D, however, a path is provided around the resistance R, and at the same time the shunt-resistance S is brought into a closed circuit from the battery.

The instrument forms a convenient and practicable device for measuring battery-resistances, the juxtaposition and arrangement of the co-operating parts adapting it to use at all times without the necessity of making the numerous connections and tests heretofore required.

What I claim as my invention is—

1. In an electrical testing or measuring apparatus, the combination, with two resistances or rheostats included in branch circuits, of electrical connections, terminals and contacts, and a key adapted to simultaneously cut out one resistance and throw in the other, as and for the purpose described.

2. In an electrical testing or measuring apparatus of the kind described, the combination, with the resistances R and S, of the key having contact-points *a*, *b*, and *e*, the spring-contacts E F adapted to be simultaneously depressed by the key and circuit connections, substantially as set forth.

3. The combination, with two resistances or rheostats, a battery, and a galvanometer, the galvanometer and one rheostat being in circuit with the battery, and the other resistance in a normally-open branch or shunt circuit thereto, of circuit connections and contacts, and a key for cutting out the resistance of the galvanometer-circuit and closing the shunt-circuit simultaneously, as and for the purpose specified.

4. The combination, with the plate A, of the resistance or rheostat plates T C, the key D. contacts E F, and circuit-connections, arranged in substantially the manner herein described.

In testimony whereof I have hereunto set my hand this 24th day of April, 1884.

MOSES G. FARMER.

Witnesses:
 AUGUSTUS SALZMAN,
 WILLIAM HEATHERTON.